(12) United States Patent
Park et al.

(10) Patent No.: US 9,740,294 B2
(45) Date of Patent: Aug. 22, 2017

(54) DISPLAY APPARATUS AND METHOD FOR CONTROLLING DISPLAY APPARATUS THEREOF

(71) Applicant: SAMSUNG ELECTRONICS CO., LTD., Suwon-si (KR)

(72) Inventors: Hong-seok Park, Suwon-si (KR); Moon-seok Jang, Seoul (KR); Byung-chul Kim, Suwon-si (KR); Sun-ho Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 174 days.

(21) Appl. No.: 14/317,429

(22) Filed: Jun. 27, 2014

(65) Prior Publication Data

US 2015/0002390 A1 Jan. 1, 2015

Related U.S. Application Data

(60) Provisional application No. 61/840,877, filed on Jun. 28, 2013.

(30) Foreign Application Priority Data

Apr. 21, 2014 (KR) ........................ 10-2014-0047242

(51) Int. Cl.
*G06F 3/01* (2006.01)
*G06F 3/0487* (2013.01)
*G06F 3/0346* (2013.01)

(52) U.S. Cl.
CPC .............. *G06F 3/017* (2013.01); *G06F 3/013* (2013.01); *G06F 3/0346* (2013.01); *G06F 3/0487* (2013.01)

(58) Field of Classification Search
CPC ...... G06F 3/013; G06F 3/0487; G06F 3/0346; G06F 3/017; A63F 2300/1087; A63F 2300/8076; A63F 13/06; A63F 2300/1006; A63F 2300/1043
See application file for complete search history.

(56) References Cited

U.S. PATENT DOCUMENTS

| | | | |
|---|---|---|---|
| 2008/0096657 A1 | 4/2008 | Benoist | |
| 2010/0201808 A1* | 8/2010 | Hsu ........................ | A63F 13/213 348/135 |
| 2012/0075183 A1* | 3/2012 | Liberty ................. | G06F 3/0346 345/158 |

\* cited by examiner

*Primary Examiner* — Vijay Shankar
*Assistant Examiner* — Abhishek Sarma
(74) *Attorney, Agent, or Firm* — Sughrue Mion, PLLC

(57) ABSTRACT

A display apparatus and a controlling method are provided, in which the controlling method of the display apparatus receives movement information of a mobile terminal from the mobile terminal, obtains mobile terminal images by photographing the mobile terminal, transforms the received movement information into a screen coordinate system arrayed based on screen of the display apparatus, compensates the movement information transformed into the screen coordinate system based on the mobile terminal images, and controls the display apparatus by using the compensated movement information.

18 Claims, 17 Drawing Sheets

— FROM IMAGES
--- FROM SENSORS

DISPLAY APPARATUS AND METHOD FOR CONTROLLING DISPLAY APPARATUS THEREOF

CROSS-REFERENCE TO RELATED APPLICATIONS

This application claims priority from U.S. Provisional Patent Application No. 61/840,877, filed on Jun. 28, 2013 in the United States Patent and Trademark Office, and Korean Patent Application No. 10-2014-0047242, filed on Apr. 21, 2014 in the Korean Intellectual Property Office, the disclosures of which are incorporated herein by reference in their entirety.

BACKGROUND

1. Field

Devices and methods consistent with exemplary embodiments relate to displaying, and more specifically, to a display apparatus configured to control various functions of the display apparatus by using information regarding movements of external mobile terminals, and a controlling method thereof.

2. Description of the Related Art

Recently, in order to control display apparatuses more intuitively, new methods to control functions of display apparatuses by using user motions are being developed. For example, a mobile terminal may sense movement information according to user motions, and transmit the sensed movement information to external display apparatuses. Further, display apparatuses control various functions of the display apparatuses (e.g., moving pointing) by using the transmitted movement information. For another example, display apparatuses control various functions of the display apparatuses based on the photographed movement information after photographing movements of a mobile terminal.

However, as explained above, in a related method for transmitting movement information using a mobile terminal, relative motions of the mobile terminal may be sensed only, and there may be a problem in which it is difficult to obtain further information from the mobile terminal to ensure better accuracy with respect to the movement of the mobile terminal. Further, with respect to a method for photographing a mobile terminal by display apparatuses, there may be a problem in which it is difficult to obtain further accurate sensing of three-dimensional motions of a mobile terminal.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an exemplary embodiment, a technical objective is to provide a display apparatus which compensates the received movement information from a mobile terminal by using the photographed mobile terminal images, so that the display apparatus is controlled more correctly and intuitively by using the mobile terminal, and a controlling method thereof.

According to an exemplary embodiment, a controlling method of a display apparatus is provided, which may include receiving movement information of a mobile terminal from the mobile terminal and obtaining mobile terminal images by photographing the mobile terminal, transforming the received movement information into a screen coordinate system arrayed based on a screen of the display apparatus, compensating the movement information transformed into the screen coordinate system based on the mobile terminal images, and controlling the display apparatus by using the compensated movement information.

The received movement information from the mobile terminal may be a value measured based on a mobile terminal coordinate system arrayed based on the mobile terminal, and the transforming may include transforming the received movement information measured based on the mobile terminal coordinate system into a global coordinate system arrayed based on geomagnetic direction; and transforming the movement information transformed into the global coordinate system into the screen coordinate system.

The transforming may additionally include, when a camera coordinate system arrayed based on a camera photographing the mobile terminal is different from the screen coordinate system, transforming the movement information transformed into the screen coordinate system into the camera coordinate system.

When inputs are received from a user while the mobile terminal is arrayed toward a screen direction of the display apparatus, transforming parameters of the screen coordinate system may be calculated based on a shape of the mobile terminal.

The compensating may include compensating the movement information by comparing a size of the mobile terminal obtained from the mobile terminal images with a previously obtained actual size of the mobile terminal.

The compensating may include comparing the movement information of the mobile terminal obtained from the mobile terminal images with the movement information transformed into the screen coordinate system, and when the movement information of the mobile terminal obtained from the mobile terminal images is not in agreement with the movement information transformed into the screen coordinate system, synchronizing the movement information of the mobile terminal obtained from the mobile terminal images with the movement information transformed into the screen coordinate system.

The controlling may include recognizing three-dimensional movements of the mobile terminal by using the compensated movement information, and controlling the display apparatus based on the recognized three-dimensional movements.

The controlling may include when there is a plurality of mobile terminals operating, sensing movement patterns respectively corresponding to the plurality of the mobile terminals by using the compensated movement information, respectively, with respect to the plurality of the mobile terminals; and recognizing the plurality of the mobile terminals by using the movement patterns respectively corresponding to the plurality of the mobile terminals.

The controlling may include controlling the display apparatus based on the compensated movement information only when the mobile terminal is photographed.

The controlling may include calculating pointing coordinate values based on the compensated movement information, and displaying a pointer on the pointing coordinate values.

In one exemplary embodiment, a display apparatus is provided, which may include a communicator configured to receive movement information of a mobile terminal from the mobile terminal, an image acquirer configured to obtain mobile terminal images by photographing the mobile terminal, and a controller configured to transform the received movement information into a screen coordinate system arrayed based on a screen of the display apparatus, compensate the movement information transformed into the screen coordinate system based on the mobile terminal images, and control the display apparatus by using the compensated movement information.

The received movement information from the mobile terminal may be a value measured based on a mobile terminal coordinate system arrayed based on the mobile terminal, and the controller may transform the movement information measured based on the mobile terminal coordinate system into a global coordinate system arrayed based on geomagnetic direction, and transform the movement information transformed into the global coordinate system into the screen coordinate system.

When a camera coordinate system arrayed based on a camera photographing the mobile terminal is not in agreement with the screen coordinate system, the controller may transform the movement information transformed into the screen coordinate system into the camera coordinate system.

When an input is received from a user while the mobile terminal is arrayed toward a screen direction of the display apparatus, transforming parameters of the screen coordinate system may be calculated based on a shape of the mobile terminal.

The controller may compensate the movement information by comparing a size of the mobile terminal obtained from the mobile terminal images with a previously obtained actual size of the mobile terminal.

The controller may compare the movement information of the mobile terminal obtained from the mobile terminal images with the movement information transformed into the screen coordinate system, and synchronize the movement information of the mobile terminal obtained from the mobile terminal images with the movement information transformed into the screen coordinate system, when the movement information of the mobile terminal obtained from the mobile terminal images is not in agreement with the movement information transformed into the screen coordinate system.

The controller may recognize three-dimensional movements of the mobile terminal by using the compensated movement information, and control the display apparatus based on the recognized three-dimensional movements.

When there is a plurality of mobile terminals operating, the controller may senses movement patterns respectively corresponding to the plurality of the mobile terminals by using the compensated movement information, respectively, related to the plurality of the mobile terminals, and recognizes the plurality of the mobile terminals by using the movement patterns respectively corresponding to the plurality of the mobile terminals.

The controller may control the display apparatus based on the compensated movement information only when the mobile terminal is photographed.

The display apparatus may additionally include a display, and the controller may control the display to calculate pointing coordinate values based on the compensated movement information, and display a pointer based on the pointing coordinate values.

According to another exemplary embodiment, there is provided a controlling method of a display apparatus which may include: receiving movement information of a mobile terminal and obtaining mobile terminal images by photographing the mobile terminal; transforming the received movement information into a first system; compensating the movement information transformed into the first system based on the mobile terminal images; and controlling the display apparatus by using the compensated movement information.

According to yet another exemplary embodiment, there is provided a display apparatus, which may include: a communicator configured to receive movement information of a mobile terminal; an image acquirer configured to obtain mobile terminal images by photographing the mobile terminal; and a controller configured to transform the received movement information into a first system, compensate the movement information transformed into the first system based on the mobile terminal images, and control the display apparatus by using the compensated movement information.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION OF EXEMPLARY EMBODIMENTS

Figure 1:
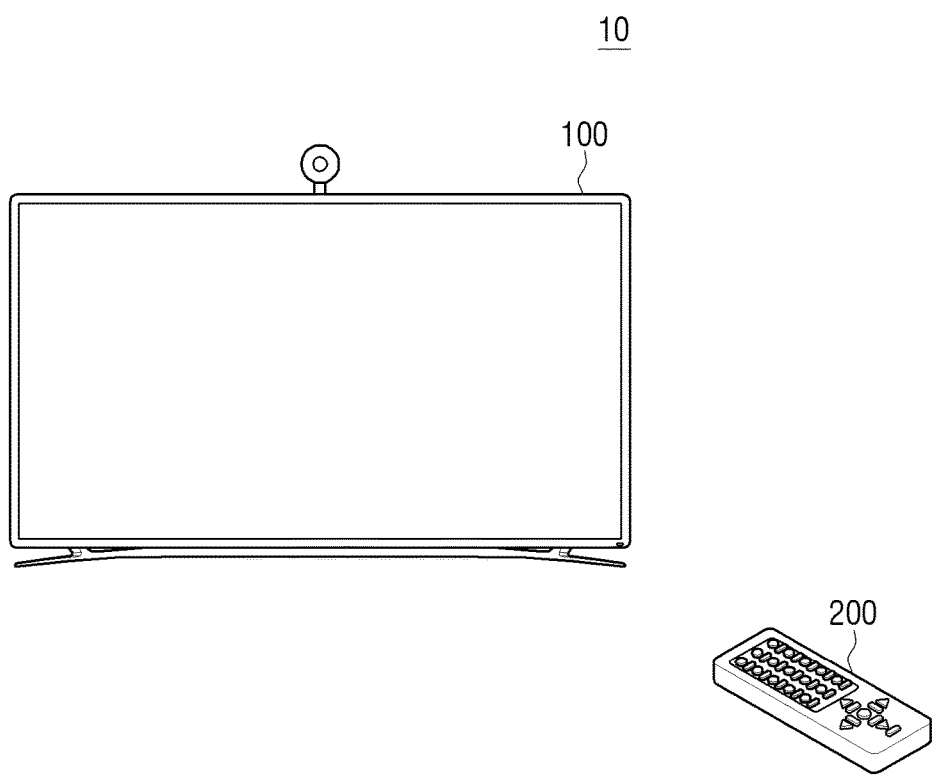
FIG. 1 illustrates a display system according to an exemplary embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

Terms such as "first" and "second" may be used to explain various units; however, the units cannot be limited with the terms. Terms are used only for the purpose of distinguishing one unit from the other.

Terms of this specification are used for the intention of explaining specific exemplary embodiments, and do not limit the scope of the invention. Singular expression includes plural expression except that both expressions indicate different meanings. Terms such as "include" or "comprise" in this specification indicate the presenting of features, numbers, processes, operations, units, parts or combinations of the foregoing described in the specification, and do not exclude the presenting of one or more than one other different features, numbers, processes, operations, units, parts or combinations of the foregoing or adding possibilities.

According to an exemplary embodiment, "module" or "unit" performs at least one function or operation; it may be implemented to be hardware, software, or combinations of hardware and software. Further, a plurality of "modules" or a plurality of "units" may be implemented to be at least one processor (not illustrated) by being united into at least one module except for "modules" or "units" which should be implemented to be specific hardware.

Referring to the attached drawings, the invention will be described in detail below.

FIG. 1 illustrates a display system 10 according to an exemplary embodiment. Referring to FIG. 1, the display system 10 includes a display apparatus 100 and a mobile terminal 200 controlling the display apparatus. Meanwhile, the display apparatus 100 according to an exemplary embodiment may be smart TV; however, this is merely one of the exemplary embodiments. The display apparatus 100 may be various display apparatuses such as a digital TV, desktop PC, and notebook PC. Further, the mobile terminal 200 may be a smart phone; however, this is merely one of the exemplary embodiments. The mobile terminal 200 may be various mobile terminals such as pointing device, a remote controller, and a tablet PC.

First, the mobile terminal 200 senses movement information according to user motions. At this process, the mobile terminal 200 may sense movement information by using at least one of an acceleration sensor, a geomagnetic sensor and a gyro sensor. Further, the mobile terminal 200 transmits the sensed movement information to the display apparatus 100.

The display apparatus 100 receives movement information of the mobile terminal 200 from the mobile terminal 200. At this process, the display apparatus 100 photographs the mobile terminal 200 and obtains mobile terminal images while receiving movement information from the mobile terminal 200.

Further, the display apparatus 100 transforms the received movement information into a screen coordinate system arrayed based on the screen of the display apparatus. Specifically, the display apparatus 100 may transform the movement information at a mobile terminal coordinate system which is arrayed based on the mobile terminal 200 into a global coordinate system which is arrayed based on a geomagnetic direction. Further, the display apparatus 100 may transform the movement information transformed into the global coordinate system into the screen coordinate system. Further, when the screen coordinate system is not in agreement with the camera coordinate system arrayed based on a camera, the display apparatus 100 may transform the movement information which has been compensated, or adjusted, at the screen coordinate system, into the camera coordinate system. Meanwhile, transforming parameters of the above screen coordinate system may be calculated based on a shape of the photographed mobile terminal 200 when initial input is received from a user while the mobile terminal 200 is arrayed toward a screen direction of the display apparatus.

Further, the display apparatus 100 may compensate the movement information transformed into the screen coordinate system based on mobile terminal images. Herein, the display apparatus 100 may compensate size and timing of the mobile terminal 200 based on mobile terminal images. Specifically, the display apparatus 100 may compensate the movement information by comparing size of the mobile terminal 200 obtained from mobile terminal images with previously obtained actual size of the mobile terminal 200. Further, when the movement information of the mobile terminal obtained from mobile terminal images is not in agreement with the movement information transformed into the screen coordinate system by comparing the movement information of the mobile terminal 200 obtained from images of the mobile terminal 200 with the movement information transformed into the screen coordinate system, the display apparatus 100 may synchronize the movement information of the mobile terminal obtained from mobile terminal images with the movement information transformed into the screen coordinate system.

Further, the display apparatus 100 may control various functions of the display apparatus 100 based on the compensated movement information. Specifically, the display apparatus 100 may recognize three-dimensional movements of the mobile terminal 200 by using the compensated movement information, and control the display apparatus based on the recognized three-dimensional movements. Further, when a plurality of mobile terminals operate, the display apparatus 100 may sense movement patterns respectively corresponding to a plurality of the mobile terminals by using the compensated movement information of each of the plurality of mobile terminals, respectively, and recognize a plurality of the mobile terminals by using the corresponding patterns respectively of the plurality of the mobile terminals. Further, the display apparatus 100 may display a pointer on the pointing coordinate values by calculating pointing coordinate values based on the compensated movement information. Other various exemplary embodiments will be specifically described by referring to drawings in a later part of the specification.

Figure 2:
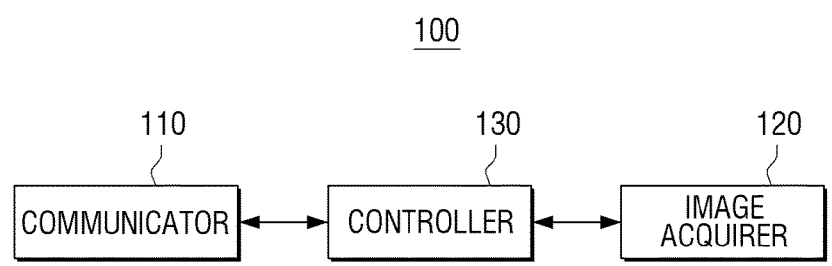
FIG. 2 is a brief block diagram of a display apparatus according to an exemplary embodiment.

FIG. 2 is a brief block diagram of the display apparatus 100 according to an exemplary embodiment. Referring to FIG. 2, the display apparatus 100 includes a communicator 110, an image acquirer 120, and a controller 130.

The communicator 110 performs communication with the external mobile terminal 200. At this process, the communicator 110 may receive movement information of the mobile terminal 200 according to user motions from the mobile terminal 200. Meanwhile, the communicator 110 according to an exemplary embodiment may perform communication with the mobile terminal 200 by using Bluetooth method; however, this is merely one of embodiments, the communicator 110 may perform communication with the mobile terminal 200 by using other communication methods such as infrared communication method, WiFi communication method, and Zigbee communication method.

The image acquirer 120 photographs images by using the camera, and obtains images by processing the photographed images. At this process, the image acquirer 120 may obtain mobile terminal images including the mobile terminal 200.

The controller 130 controls general operation of the display apparatus 100. Specifically, the controller 130 transforms the received movement information from the external mobile terminal 200 into the screen coordinate system arrayed based on the screen of the display apparatus 100, compensates the movement information transformed into the screen coordinate system, and controls the display apparatus 100 by using the compensated movement information.

Specifically, the controller 130 controls the communicator 110 to receive movement information from the mobile terminal 200. At this process, the movement information received from the mobile terminal 200 is value measured based on the mobile terminal coordinate system which is arrayed based on the mobile terminal 200.

Further, the controller 130 may transform the movement information measured based on the mobile terminal coordinate system into the global coordinate system which is arrayed based on geomagnetic direction, and transform the movement information transformed into the global coordinate system into the screen coordinate system again. At this process, the controller 130 may transform the movement information into a different coordinate system through the rotating transformation matrix. Specifically, when initial inputting is inputted from a user while the mobile terminal 200 is arrayed toward screen direction of the display apparatus 100, the controller 130 may calculate transforming parameters based on the shape of the mobile terminal 200, and store the calculated transforming parameters. Further, the controller 130 may transform the movement information at the mobile terminal coordinate system into the movement information at the screen coordinate system by using the stored transforming parameters.

Meanwhile, when the camera coordinate system arrayed based on the camera photographing the mobile terminal 200 is different from the screen coordinate system, the controller 130 may transform the movement information transformed into the screen coordinate system into the camera coordinate system again.

Further, the controller 130 may compensate the movement information by using the actual size of the mobile terminal and moving time points. Specifically, the controller 130 may compensate the movement information by comparing the size of the mobile terminal 200 obtained from mobile terminal images with the previously obtained actual size of the mobile terminal 200. Further, the controller 130 may compare the movement information of the mobile terminal 200 obtained from mobile terminal images with the movement information transformed into the screen coordinate system. When the movement information of the mobile terminal 200 obtained from mobile terminal images is not in agreement with the movement information transformed into the screen coordinate system, the controller 130 may synchronize the movement information of the mobile terminal obtained from mobile terminal images with the movement information transformed into the screen coordinate system.

Further, the controller 130 may control various functions of the display apparatus 100 by using the compensated movement information.

Specifically, the controller 130 may recognize three-dimensional movements of the mobile terminal 200 by using the compensated movement information, and control the display apparatus based on the recognized three-dimensional movements. Further, when a plurality of mobile terminals operate, the controller 130 may sense movement patterns respectively corresponding to a plurality of the mobile terminals by using the compensated movement information of each of the plurality of mobile terminals, respectively, and recognize a plurality of the mobile terminals by using the movement patterns respectively corresponding to a plurality of the mobile terminals. Further, the controller 130 may control the display apparatus 100 based on the compensated movement information only when the mobile terminal 200 is photographed. Further, the controller 130 may calculate pointing coordinate values based on the compensated movement information, and display a pointer on the calculated pointing coordinate values.

With the display apparatus 100 described above, a user may control the display apparatus more correctly and intuitively by using the mobile terminal.

Figure 3:
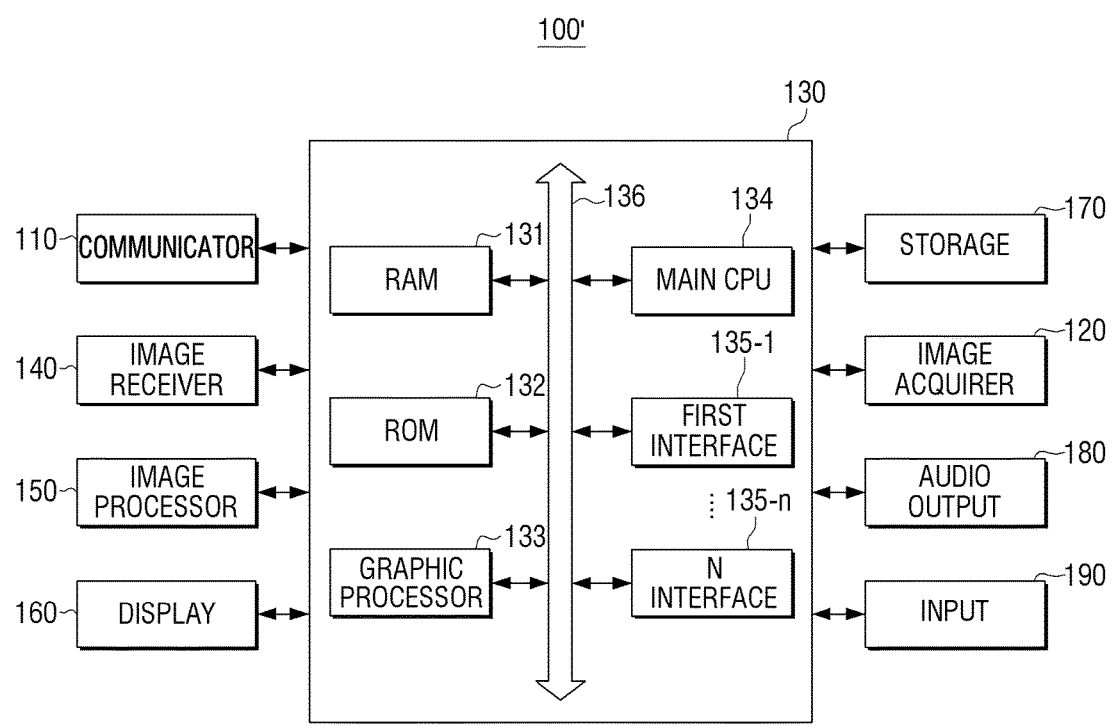
FIG. 3 is a block diagram of the display apparatus in detail according to an exemplary embodiment.
Figure 4:
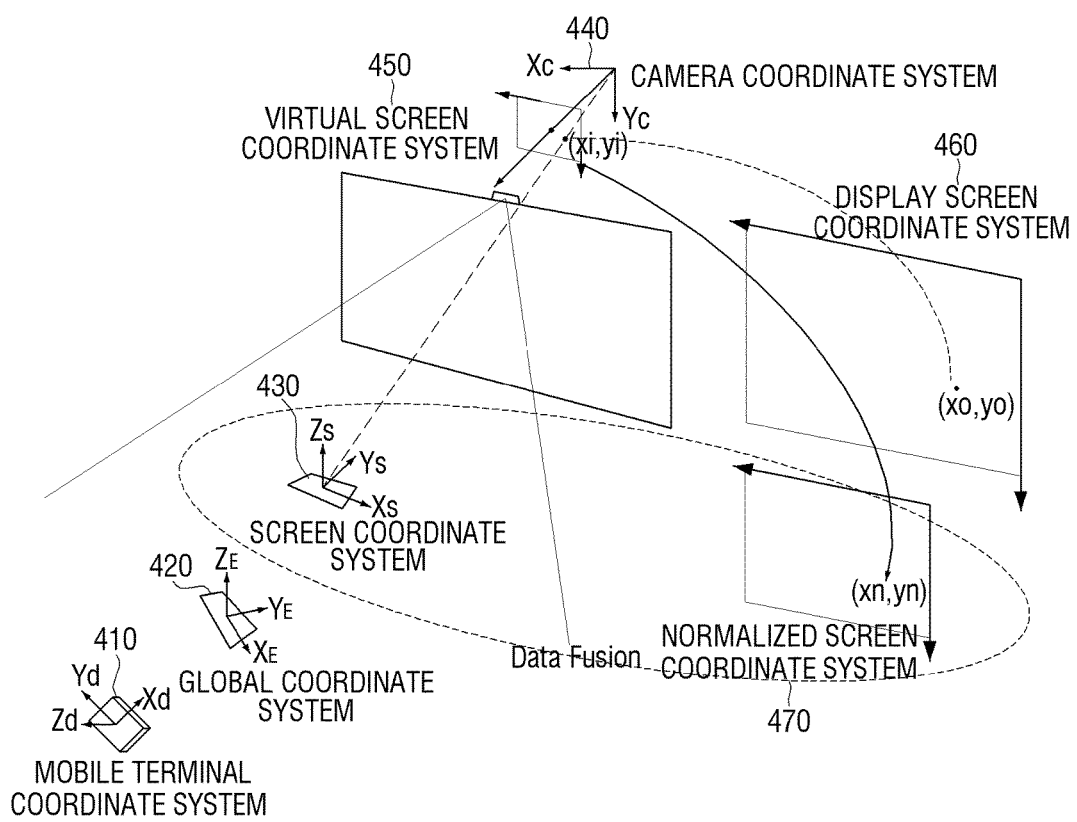
FIG. 4 illustrates a plurality of coordinate systems according to an exemplary embodiment.

The following will explain various exemplary embodiments of the invention by referring to FIGS. 3 to 13. FIG. 3 is a block diagram of the display apparatus 100 in detail according to an exemplary embodiment. Referring to FIG. 3, the display apparatus 100 includes the communicator 110, an image receiver 140, an image processor 150, a display 160, a storage 170, the image acquirer 120, an audio output 180, an input 190, and a controller 130.

The communicator 110 is a unit which performs communication with various types of external devices according to various types of communication methods. The communicator 110 may include various communication chips such as an infrared communication chip, WiFi chip, Bluetooth chip, NFC chip, and wireless communication chip. Herein, a WiFi chip, Bluetooth chip, and NFC chip perform communication respectively according to a WiFi method, Bluetooth method, and NFC method. NFC chip indicates a chip which operates according to NFC method using 13.56 MHz bandwidth among various RF-ID frequency bandwidths such as 135 kHz, 13.56 MHz, 433 MHz, 860~960 MHz, and 2.45 GHz. When WiFi chip or Bluetooth chip is used, various pieces of connecting information such as SSID and session key may be first trans-received, communication connects by using the above information, and various pieces of information may be trans-received. The wireless communication chip indicates a chip which performs communication according to various communication standards such as IEEE, Zigbee, 3rd Generation (3G), 3rd Generation Partnership Project (3GPP), and Long Term Evolution (LTE).

Specifically, the communicator 110 may receive movement information of the mobile terminal 200 from the mobile terminal 200 according to user motions. Herein, the receive movement information from the mobile terminal 200 may be value measured based on the mobile terminal coordinate system which is arrayed based on the mobile terminal 200.

The image receiver 140 receives image contents from various sources. Specifically, the image receiver 140 may receive broadcasting contents from external broadcasting stations, and video contents from external devices (e.g., DVD player and set-top box).

The image processor 150 is unit which performs the processing regarding the received video data from the image receiver 140. The image processor 150 may perform various image processing such as decoding, scaling, noise filtering, frame rate converting, and resolution converting regarding video data.

The display 160 displays at least one frame among the video frames obtained by processing the received video data from the image receiver 140 with the image processor 150 and various screens generated with a graphic processor 133. Specifically, the display 160 may display a pointer based on the movement information of the mobile terminal 200.

The storage 170 stores various modules to drive the display apparatus 100. For example, the storage 170 may store software including a base module, sensing module, communication module, presentation module, web browser module, and service module. Herein, the base module is a basic module which processes signals delivered from each of hardware included in the display apparatus 100 and delivers the processed signals to upper layer modules. The sensing module is a module which collects information from various sensors, analyzes and manages the collected information. It may include a face recognizing module, voice recognizing module, motion recognizing module and Near Field Communication (NFC) recognizing module. The presentation module is a module which constitutes display screens. It may include a multimedia module to reproduce and output multimedia contents and UI rendering module to perform the processing of a UI and graphics. The communication module is a module which performs communication externally. The web browser module indicates a module which accesses a web server by performing the web browsing. The service module is a module which includes various applications to provide various services.

Further, the storage 170 may store transforming parameters to transform the movement information measured based on the mobile terminal coordinate system into the screen coordinate system.

The image acquirer 120 photographs images and obtains images by processing the photographed images. Specifically, the image acquirer 120 may photograph areas including the mobile terminal 200 by using the camera, process the photographed images, and obtain mobile terminal images.

The audio output 180 is a unit which outputs various alarm sounds or voice messages as well as various audio data processed in an audio processor (not illustrated).

The input 190 receives various user commands to control the display apparatus 100. Herein, the input 190 may be implemented to be various inputting devices such as a remote controller, touch screen, mouse, voice input, and motion input.

The controller 130 includes RAM 131, ROM 132, the graphic processor 133, main CPU 134, first to n interfaces 135-1~135-$n$, and a bus 136, as illustrated in FIG. 3. Herein, RAM 131, ROM 132, the graphic processor 133, the main CPU 134, and the first to n interfaces 135-1~135-$n$ may be connected with each other through the bus 136.

ROM 132 stores a set of commands for booting the system. When a turn-on command is inputted and electrical power is supplied, the main CPU 134 copies the stored O/S in the storage 170 to RAM 131 according to the stored commands in ROM 132, and boots the system by implementing O/S. When booting completes, the main CPU 134 copies various application programs stored in the storage 170 to RAM 131, and performs various operations by implementing the copied application programs in RAM 131.

The graphic processor 133 generates screens including various objects such as a pointer, an icon, an image, and text by using a calculator (not illustrated) and a renderer (not illustrated). The calculator (not illustrated) calculates feature values such as coordinate value, shape, size, and color in which each object will be marked according to layouts of screens by using the received controlling commands from the input. The renderer generates various layouts of screens including objects based on the calculated feature values in the calculator. The screens generated in the renderer are displayed within the display area of the display 160.

The main CPU 134 accesses the storage 170 and performs the booting by using the O/S stored in the storage 170. Further, the main CPU 134 performs various operations by using a plurality of programs, contents and data which are stored in the storage 170.

The first to n interfaces 135-1~135-$n$ connect to the above described units. One of the interfaces may be a network interface connected with external devices through a network.

Meanwhile, before explaining the operation of the controller 130, the coordinate systems described in this specification will be specifically described by referring to FIG. 3. The mobile terminal coordinate system 410 is a coordinate system arrayed based on the mobile terminal, the global coordinate system 420 is a coordinate system arrayed based on geomagnetic direction, the screen coordinate system 430 is coordinate system arrayed based on the screen of the display apparatus 100, and the camera coordinate system 440 is coordinate system arrayed based on the camera included in the display apparatus 100. Virtual coordinate system 450 is a coordinate system which is separated by a certain distance from a focal point of the camera and where the image is captured, the display screen coordinate system 460 is a coordinate system whose size is adjusted to express mobile terminal images through the display apparatus 100, and normalized screen coordinate system 470 is a coordinate system whose size is adjusted through mobile terminal images.

Specifically, the controller 130 may control the communicator 110 to receive movement information from the mobile terminal 200. Herein, the received movement information from the mobile terminal 200 may be arrayed values (xd, yd, zd) at the mobile terminal coordinate system.

Figure 5A:
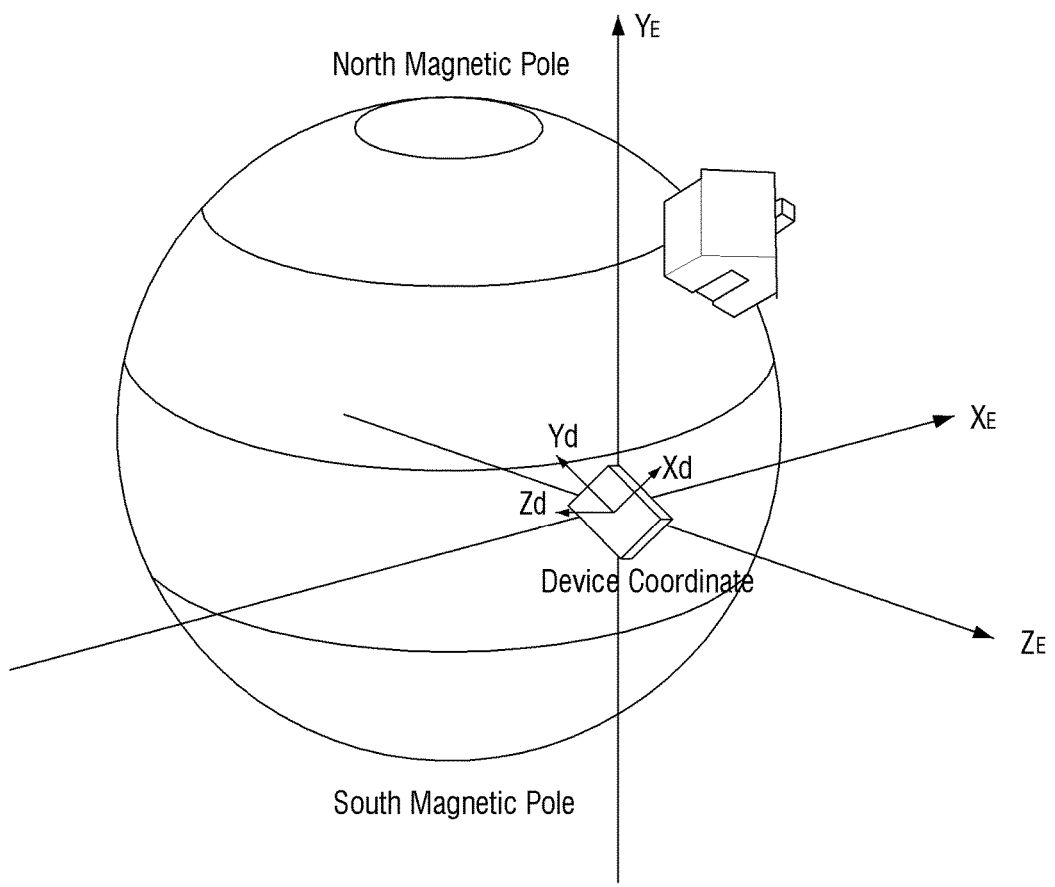
FIGS. 5A to 5C are views provided to explain coordinate system transformation according to an exemplary embodiment.

Further, the controller 130 may transform the movement information at the mobile terminal coordinate system into the screen coordinate system. Specifically, the controller 130 may transform the movement information at the mobile terminal coordinate system into the global coordinate system. For example, the mobile terminal coordinate system and the global coordinate system may be different to each other as illustrated in FIG. 5A.

Herein, the controller 130 may express the movement information with Euler angles, and transform the movement information at the mobile terminal coordinate system into values (xE,yE,zE) at the global coordinate system by using a following rotating transformation matrix formula.

$$R_{zyx} = R_z(\psi)R_y(\theta)R_x(\phi) = \qquad\qquad\qquad \text{[Formula 1]}$$

$$\cos\theta\cos\psi \begin{bmatrix} & \sin\phi\sin\theta\cos\psi - & \cos\phi\sin\theta\cos\psi + \\ \cos\theta\cos\psi & \cos\phi\sin\psi & \sin\phi\sin\psi \\ \cos\theta\sin\psi & \sin\phi\sin\theta\sin\psi + & \cos\phi\sin\theta\sin\psi - \\ & \cos\phi\cos\psi & \sin\phi\cos\psi \\ -\sin\theta & \sin\phi\cos\theta & \cos\phi\cos\theta \end{bmatrix}$$

$$R_x(\phi) = \begin{bmatrix} 1 & 0 & 0 \\ 0 & \cos\phi & -\sin\phi \\ 0 & \sin\phi & \cos\phi \end{bmatrix}, R_y(\theta) = \begin{bmatrix} \cos\theta & 0 & \sin\theta \\ 0 & 1 & 0 \\ -\sin\theta & 0 & \cos\theta \end{bmatrix},$$

$$R_z(\psi) = \begin{bmatrix} \cos\psi & -\sin\psi & 0 \\ \sin\psi & \cos\psi & 0 \\ 0 & 0 & 1 \end{bmatrix}$$

Herein, $\upsilon$ indicates pitch angle, $\theta$ indicates roll angle, and $\chi$ indicates yaw angle.

Figure 5B:
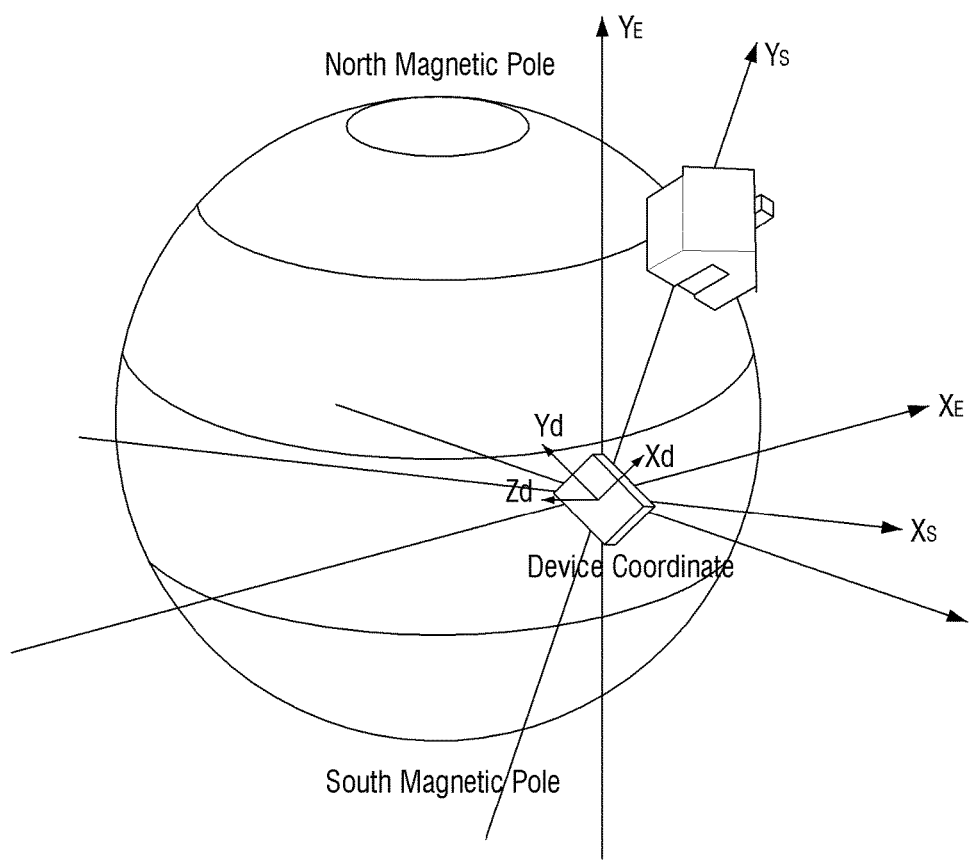

Further, the controller 130 transforms the movement information transformed into the global coordinate system into values (xS, yS, zS) at the screen coordinate system illustrated in FIG. 5B. Herein, the controller 130 may transform the movement information transformed into the global coordinate system into the movement information based on the screen coordinate system by using previously stored transforming parameters at the screen coordinate system. Transforming parameters at the screen coordinate system may be calculated based on shape of the photographed mobile terminal 200 when initial input is received from a user while the mobile terminal 200 is arrayed toward a screen direction of the display apparatus 100.

Figure 5C:
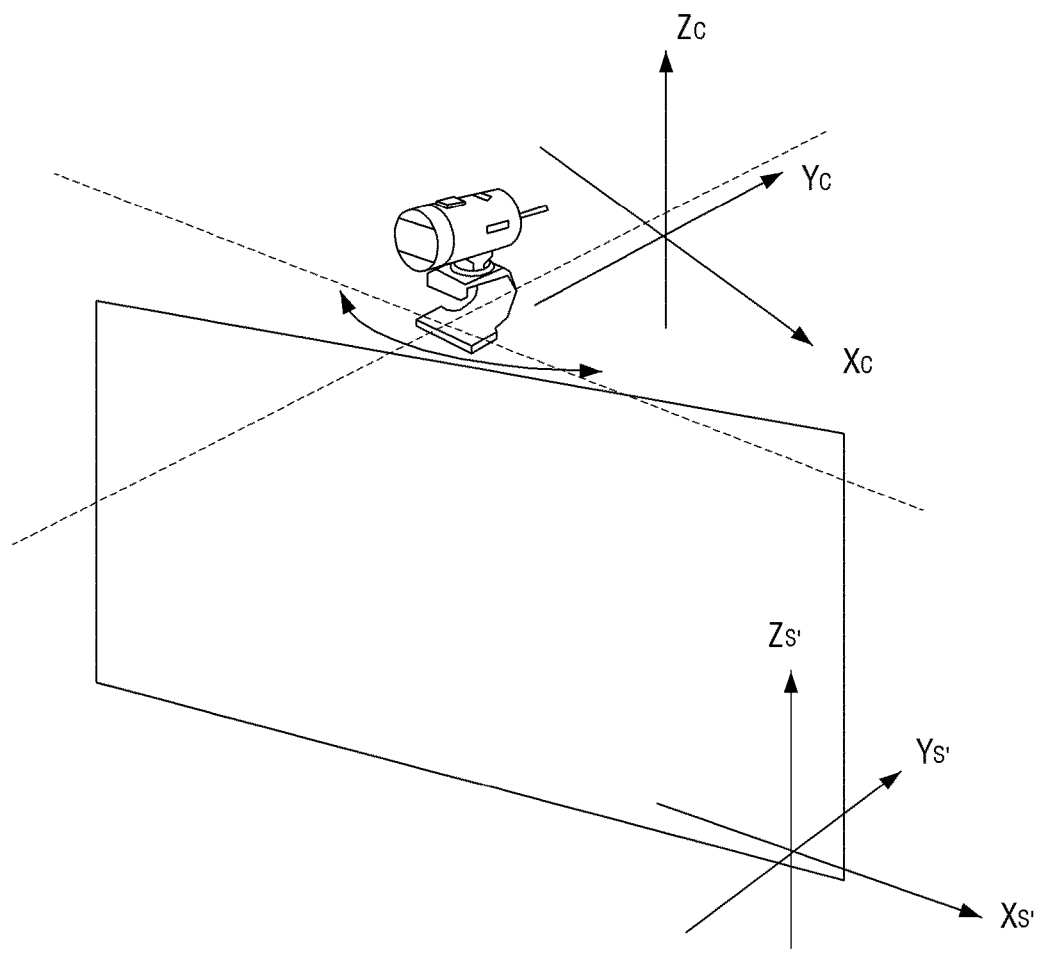

Meanwhile, although the above exemplary embodiment assumes and describes that the screen coordinate system and the camera coordinate system are in agreement with each other, this is merely one of the exemplary embodiments. When the screen coordinate system is not in agreement with the camera coordinate system, or when the camera coordinate system becomes different from the screen coordinate system because the camera rotates as illustrated in FIG. 5C, the controller 130 may finally transform the movement information at the screen coordinate system into the camera coordinate system.

Meanwhile, the above exemplary embodiment describes that the movement information at the mobile terminal coordinate system is transformed into the global coordinate system, and the global coordinate system is transformed into the screen coordinate system. However, this is merely one of the exemplary embodiments. The movement information at the mobile terminal coordinate system may be directly transformed into the screen coordinate system (or the camera coordinate system).

Further, the controller 130 may compensate the movement information transformed to the screen coordinate system based on mobile terminal images.

Specifically, the controller 130 may compensate the movement information by comparing size of the mobile terminal extracted from the mobile terminal images obtained by the image acquirer 120 with the actual size of the mobile terminal which is previously obtained. Specifically, the controller 130 may calculate normalizing parameters by comparing size of the mobile terminal obtained through mobile terminal images with the actual size of the mobile terminal which is previously obtained. Further, the controller 130 may normalize the movement information received from the mobile terminal 200 by using normalizing parameters.

Further, the controller 130 may compare the movement information of the mobile terminal 200 obtained from mobile terminal images with the movement information transformed into the screen coordinate system. When the movement information of the mobile terminal 200 obtained from mobile terminal images is not in agreement with the movement information transformed into the screen coordinate system, the controller 130 may synchronize the movement information of the mobile terminal obtained from mobile terminal images with the movement information transformed into the screen coordinate system. Specifically, the mobile terminal 200 may generate information regarding time stamps with the movement information, and transmit to the display apparatus 100. Further, the controller 130 may generate the information regarding time stamps simultaneously while obtaining mobile terminal images. The controller 130 may compensate timing by the sensed time shifting when certain time shifting is sensed by comparing the movement patterns transformed into the screen coordinate system with the movement patterns of mobile terminal images.

As described above, the controller 130 can correctly recognize the movement information of the mobile terminal 200 by transforming the coordinate systems and compensating the movement information through mobile terminal images. Specifically, the controller 130 may correctly measure movements of x, y and z axes regarding the mobile terminal 200 through the above described method.

Further, the controller 130 may control various functions of the display apparatus 100 by using the compensated movement information, as described above.

Figure 6:
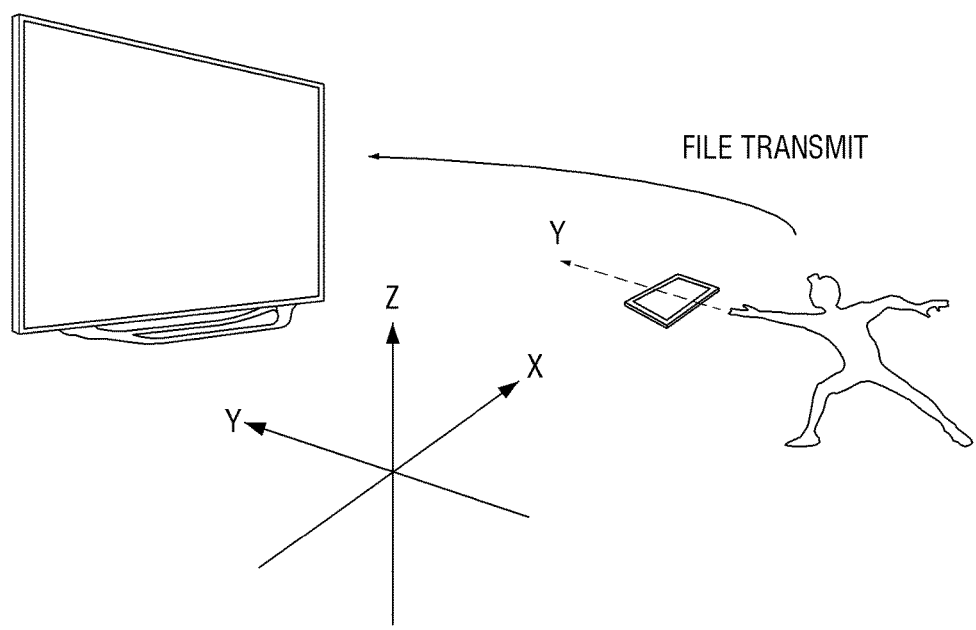
FIGS. 6 to 13 are views provided to explain controlling the display apparatus by using movement information of a mobile terminal according to various exemplary embodiments.

According to an exemplary embodiment, the controller 130 may determine three-dimensional movements of the mobile terminal 200 by using the movement information of the mobile terminal 200, and transmit controlling commands to the mobile terminal 200 by using the determined three-dimensional movements. Specifically, when movement directed toward a y-axis direction is sensed, the controller 130 may transmit controlling commands to the mobile terminal 200 in order to perform a function corresponding to the movement directed toward the y-axis direction. For example, as illustrated in FIG. 6, when movement of the mobile terminal 200 approaching toward the y-axis direction of the display apparatus 100 (i.e., movement to throw the mobile terminal 200 toward the display apparatus 100) is sensed, the controller 130 may request a file which is being reproduced by the mobile terminal 200, and the mobile terminal 200 may transmit a currently reproducing file to the display apparatus 100.

Figure 7:
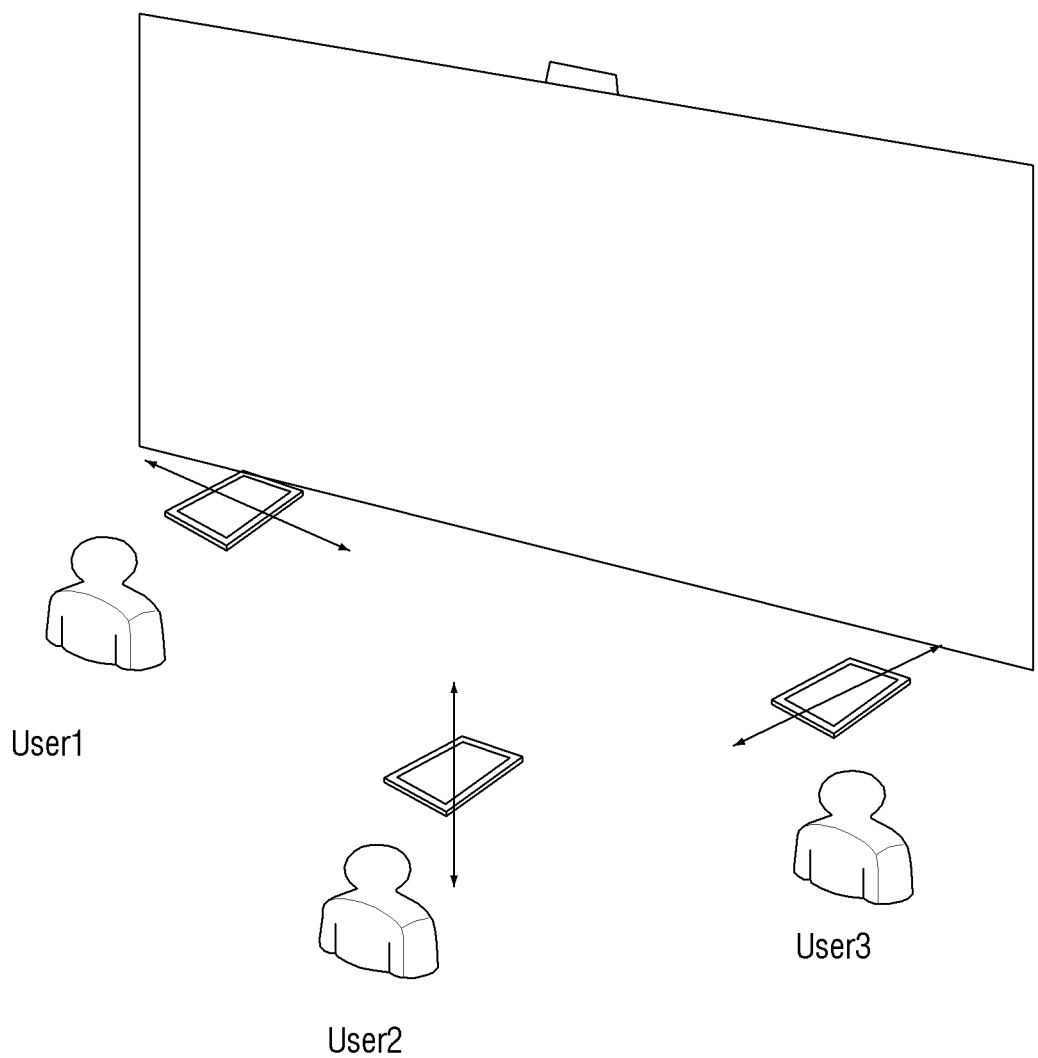

Further, when a plurality of mobile terminals operate, the controller 130 may sense movement patterns corresponding to the plurality of the mobile terminals, respectively, by using the compensated movement information with respect to each of the plurality of mobile terminals, respectively. Further, the controller 130 may recognize a plurality of the mobile terminals by using the movement patterns respectively corresponding to a plurality of the mobile terminals. Specifically, the controller 130 may distinguish a plurality of the mobile terminals by using the compensated movement information respectively regarding a plurality of the mobile terminals. For example, as illustrated in FIG. 7, the controller 130 may distinguish the mobile terminal having movement patterns directed toward the x-axis, the mobile terminal having movement patterns directed toward the y-axis, and the mobile terminal having movement patterns directed toward the z-axis. Further, the controller 130 may extract user faces respectively near the plurality of the mobile terminals by using the camera included in the image acquirer 120, and distinguish users utilizing the mobile terminals by comparing the extracted user faces with user information stored in the storage 170. Thus, when the extracted face near the mobile terminal which has patterns of moving toward the x axis, is that of user 1, the extracted face near the mobile terminal which has patterns of moving toward y axis, is user 2, and the extracted face near the mobile terminal which has patterns of moving toward the z axis, is user 3, the controller 130 may recognize each user by comparing the extracted faces with user information stored in the storage 170 respectively. Therefore, the controller 130 may control functions of the display apparatus 100 by independently using the mobile terminals of the extracted users. Further, a plurality of users can simultaneously play games through the display apparatus 100.

Figure 8:
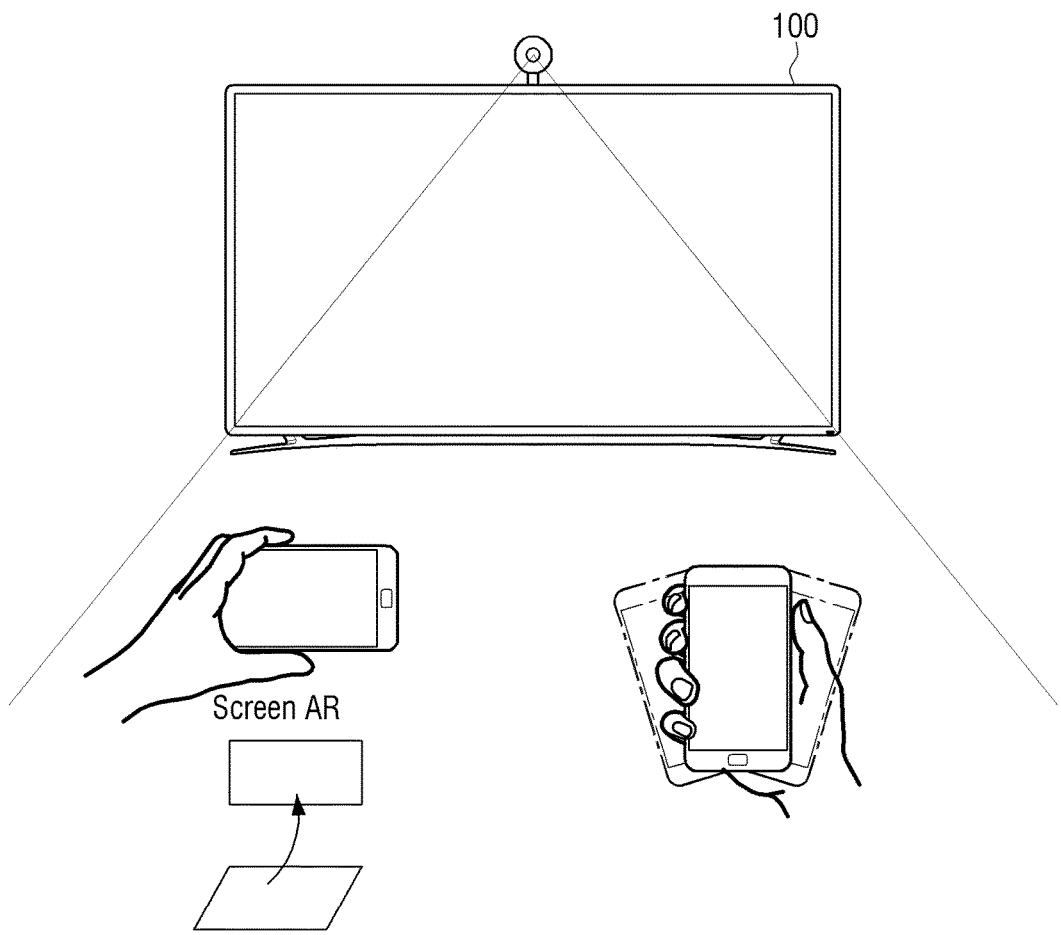

Further, the controller 130 may control the display apparatus 100 based on the compensated movement information only when the mobile terminal is photographed. Specifically, as illustrated in FIG. 8, only when the mobile terminal 200 is photographed by the camera provided from the display apparatus 100, the controller 130 may operate the display apparatus 100 by using movements of the mobile terminal 200. When the mobile terminal 200 is not photographed by the camera provided from the display apparatus 100, the controller 130 may not perform functions corresponding to movements of the mobile terminal 200 even if movements of the mobile terminal are received. Thus, the controller 130 may perform various functions of the display apparatus 100 (e.g., connecting between devices, connecting applications, screen AR mode and motion controlling mode) only when movement information of the mobile terminal 200 is received and mobile terminal images are obtained.

Figure 9:
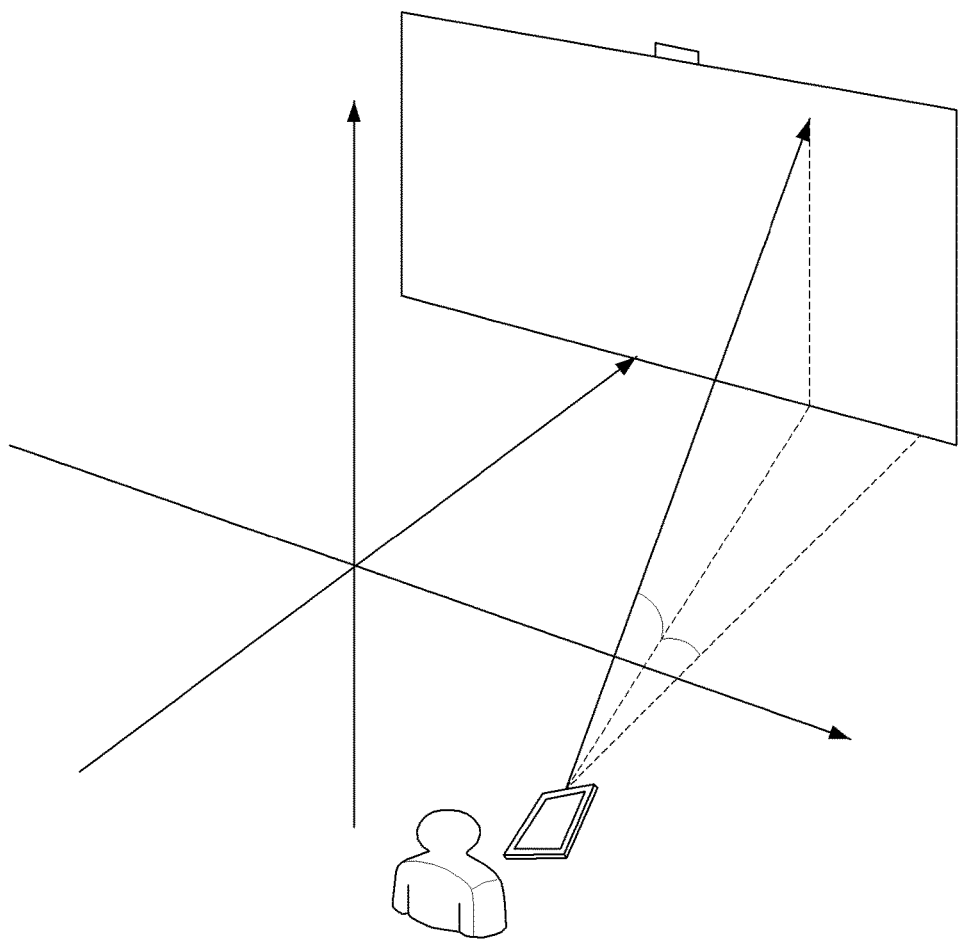

Further, the controller 130 may calculate pointing coordinate values based on the compensated movement information and control the display 160 to display a pointer on the pointing coordinate values. Specifically, as illustrated in FIG. 9, the controller 130 may sense a current position directed by the mobile terminal 200 based on mobile terminal images and movement information of the mobile terminal 200, and establish the sensed position to be the starting point. Further, the controller 130 may control the display 160 to calculate pointing coordinate values from the starting point based on the movement information of the mobile terminal 200 and display a pointer. Herein, the controller 130 may provide various applications using a pointer. For example, the controller 130 may control a web browser by using a touch pad included in the mobile terminal 200, a pointing movement, text box pointing, and a character inputting pad included in the mobile terminal 200. For another example, the controller 130 may perform various operations such as selecting objects or obtaining object information on a TV screen with a pointer. Herein, when a plurality of pointers respectively corresponding to a plurality of mobile terminals are used, the controller 130 may control the display 160 to differently display a plurality of the pointers. For example, the controller 130 may control the display 160 to display a plurality of the pointers by adjusting color, brightness and clarity of the pointers to be different to each other.

Figure 10:
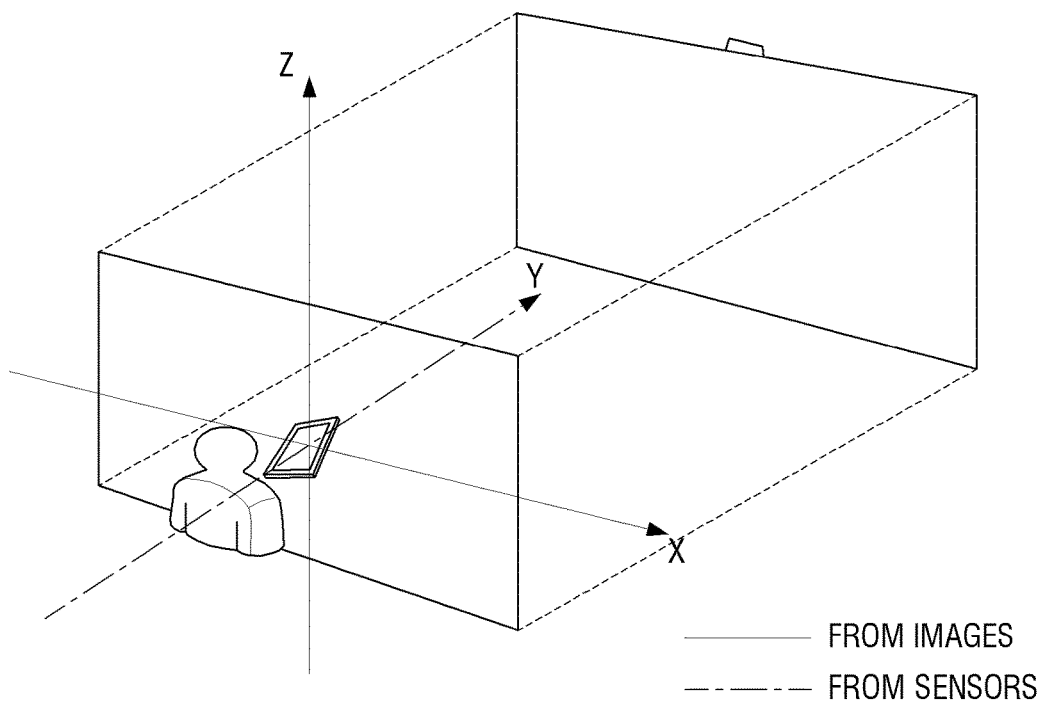

Meanwhile, the above exemplary embodiment describes that three-dimensional movements are determined by using movement information and compensated by using mobile terminal images. However, this is merely one of the embodiments. Three-dimensional movements may be obtained with other methods. Specifically, as illustrated in FIG. 10, the controller 130 may determine two-dimensional movements of the mobile terminal 200, i.e., movements directed toward x and z axes, from mobile terminal images, and movements directed toward the y axis based on the movement information of the mobile terminal 200.

Figure 11:
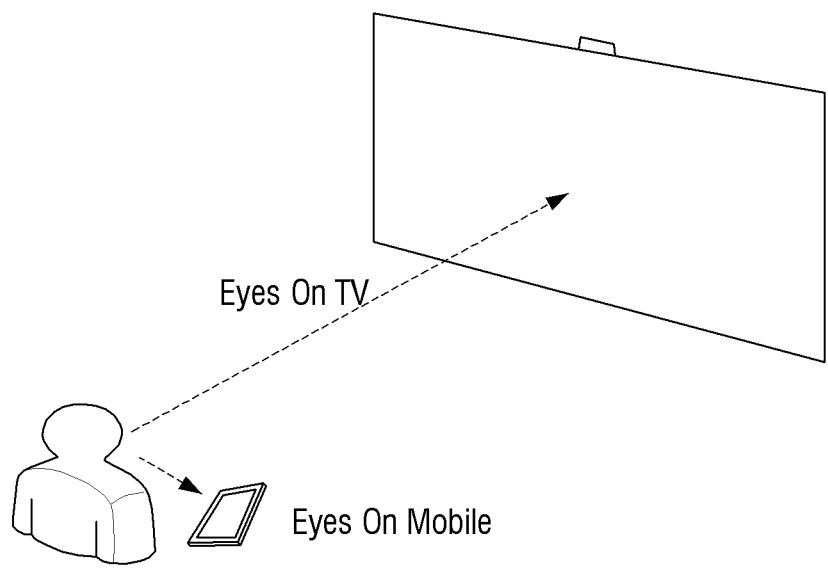

Further, the controller 130 may control various functions of the display apparatus 100 based on a user's attention to the device, i.e., user eyesight. Specifically, as illustrated in FIG. 11, the controller 130 may extract user eyesight by using the camera included in the image acquirer 120. When user eyesight directs toward the mobile terminal 200, the controller 130 does not control the display apparatus 100 by using movement information of the mobile terminal 200. Further, a user may use various applications when using the mobile terminal 200. However, when user eyesight is directed toward the display apparatus 100, the controller 130 may display a pointer on the display 160, and move a pointer by using movements of the mobile terminal 200. Herein, the controller 130 may stop the operation of applications in the mobile terminal 200 by transmitting a request to stop operation, to the mobile terminal 200.

Figure 12:
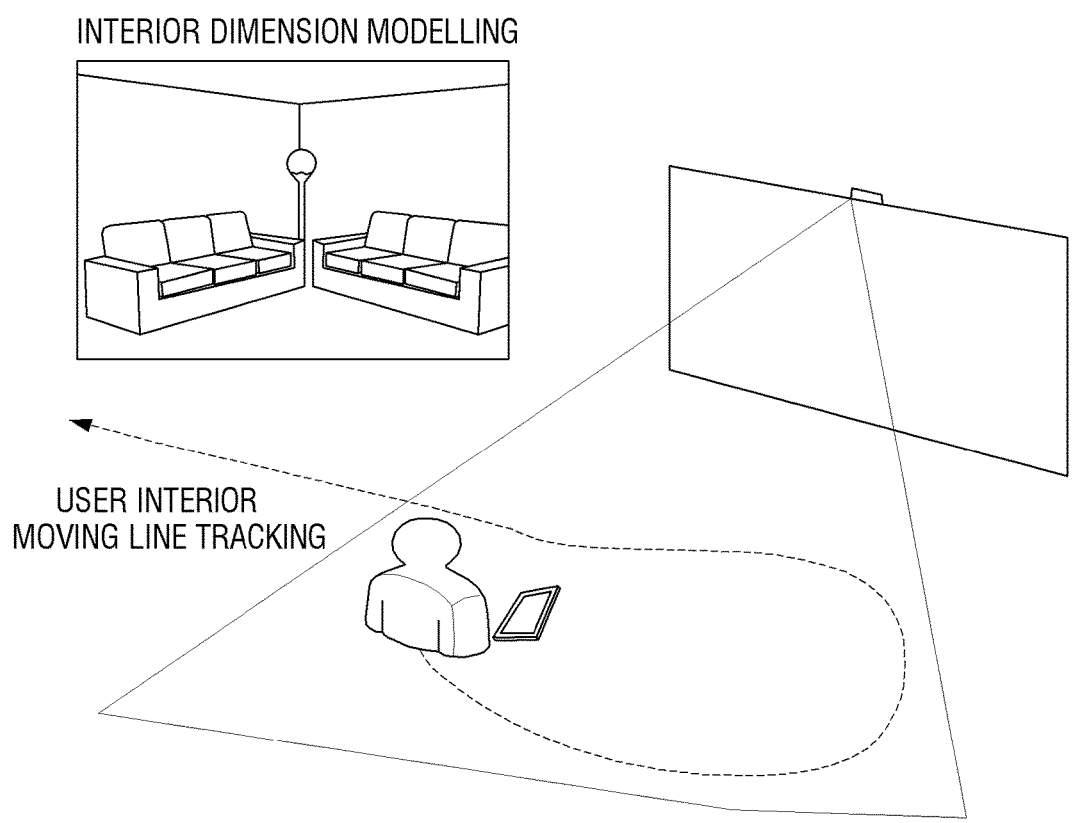

Further, the controller 130 may sense whether a user comes in or out of a screen area by using movement information of the mobile terminal 200 and mobile terminal images. Specifically, as illustrated in FIG. 12, the controller 130 may sense whether a user comes within a screen area by using mobile terminal images. Further, the controller 130 may track a user moving line within the screen area by using movement information of the mobile terminal 200 in order to reduce loading of vision processing, and track a user moving line by using mobile terminal images only when being requested. Thereby, the controller 130 may perform various application functions (e.g., function to turn on the light in an area where a user moves) by considering and tracking a user's movement. Further, the controller 130 analyzes and learns action radii or moving lines of a user having the mobile terminal 200 when modeling an interior dimension based on 2D cameras. Thus, correctness of 3D interior dimension modeling can be enhanced.

Figure 13:
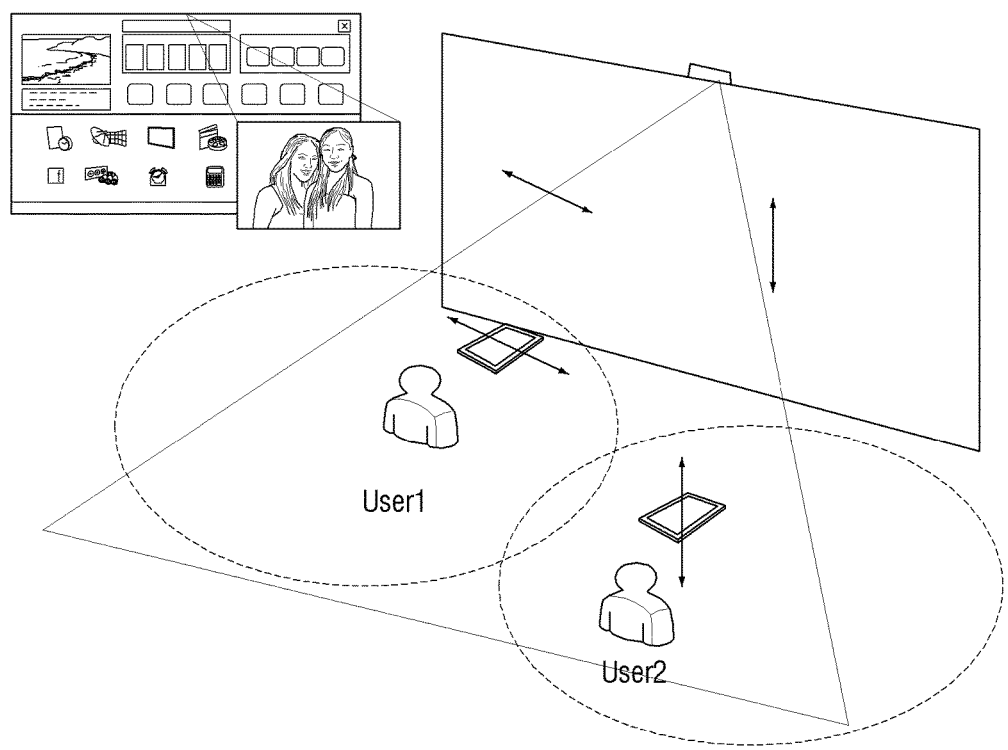

Further, the controller 130 may distinguish the mobile terminal 200 by using movement patterns of the mobile terminal 200, and authorize a user with user information of the mobile terminal 200. For example, as illustrated in FIG. 13, when a first mobile terminal having patterns of moving toward an x-axis direction is sensed, the controller 130 may perform the user authorization by using information regarding USER1 stored in the first mobile terminal. When a second mobile terminal having patterns of moving toward the z-axis direction is sensed, the controller 130 may perform the user authorization by using information regarding USER2 stored in the second mobile terminal. Thereby, a user may perform the user authorization such as logging-in by using movement patterns of the mobile terminal 200.

Figure 14:
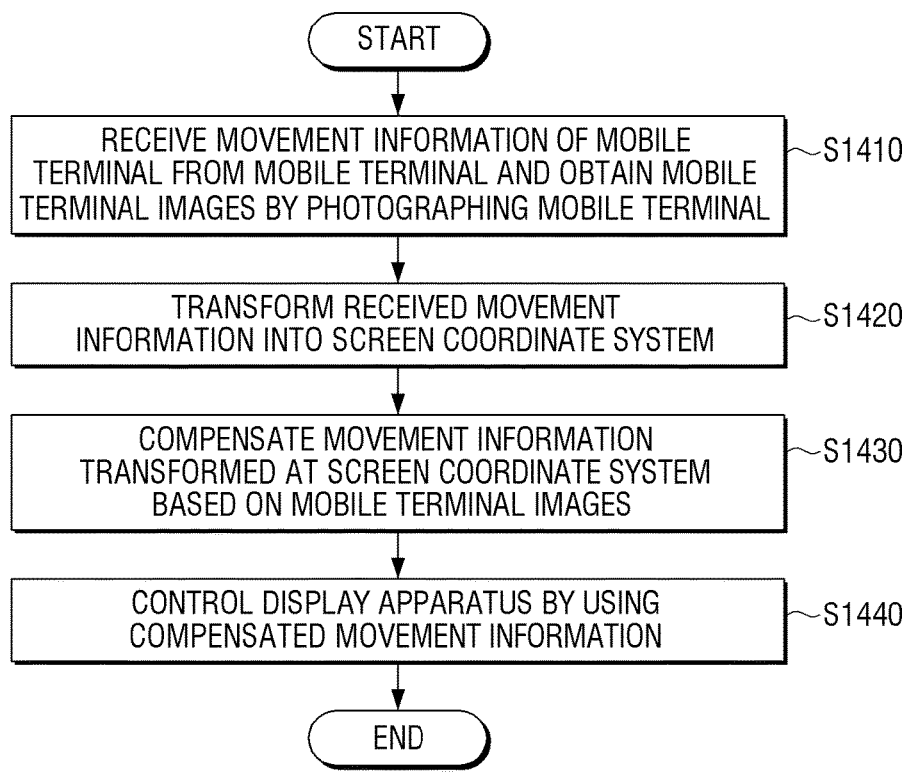
FIG. 14 is a flowchart provided to explain a controlling method of the display apparatus according to an exemplary embodiment.

The following will explain a controlling method of the display apparatus 100 by referring to FIG. 14.

At S1410, the display apparatus 100 receives movement information of the mobile terminal 200 from the mobile terminal 200, and obtains mobile terminal images by photographing the mobile terminal 200. Receiving movement information of the mobile terminal 200 and photographing the mobile terminal 200 can be simultaneously performed; however, this is merely one of the exemplary embodiments. They can be sequentially performed.

At S1420, the display apparatus 100 transforms the received movement information to the screen coordinate system. Specifically, the display apparatus 100 may transform the movement information at the mobile terminal coordinate system which is arrayed based on the mobile terminal 200 to the global coordinate system which is arrayed based on geomagnetic direction. Further, the display apparatus 100 may transform the movement information transformed into the global coordinate system to the screen coordinate system by using transforming parameters of the screen coordinate system.

At S1430, the display apparatus 100 compensates the movement information transformed into the screen coordinate system based on mobile terminal images. Specifically, the display apparatus 100 may compensate the movement information by comparing size of the mobile terminal 200 obtained from mobile terminal images with the actual size of the mobile terminal 200 which is previously obtained. Further, when the movement information of the mobile terminal obtained from mobile terminal images is not in agreement with the movement information transformed into the screen coordinate system by comparing the movement information of the mobile terminal 200 obtained from images of the mobile terminal 200 with the movement information transformed into the screen coordinate system, the display apparatus 100 may synchronize the movement information of the mobile terminal obtained from mobile terminal images with the movement information transformed into the screen coordinate system.

At S1440, the display apparatus 100 controls functions of the display apparatus 100 by using the compensated movement information. Specifically, the display apparatus 100 may control various functions illustrated in FIG. 13 by using the compensated movement information.

According to the controlling method of the display apparatus described above, a user can control the display apparatus more correctly and intuitively by using the mobile terminal.

Meanwhile, the above exemplary embodiments describe that the display apparatus 100 receives movement information from the mobile terminal 200, transforms the received movement information to the screen coordinate system which is arrayed based on the screen of the display apparatus, and compensates the movement information transformed into the screen coordinate system based on the photographed mobile terminal images. However, this is merely one of the exemplary embodiments. The technical art of the invention may also include an exemplary embodiment in which the mobile terminal 200 directly compensates the movement information.

Figure 15:
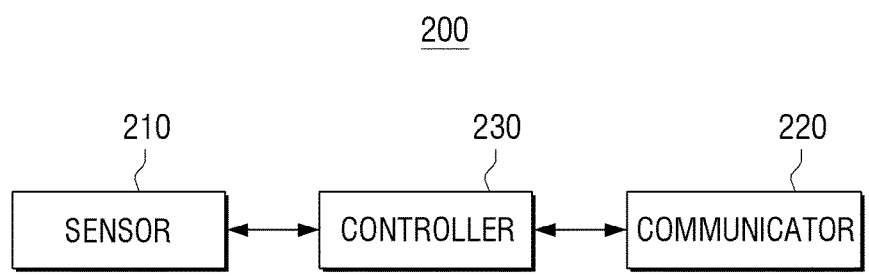
FIG. 15 is a brief block diagram of the mobile terminal according to an exemplary embodiment.

The above will be explained by referring to FIG. 15. First, the mobile terminal includes the sensor 210, the communicator 220, and the controller 230, as illustrated in FIG. 15.

The sensor 210 senses movement information of the mobile terminal by using a plurality of sensors. Specifically, the sensor 210 may sense movement information by using at least one of the acceleration sensor, the geomagnetic sensor and the gyro sensor.

The communicator 220 performs communication with the external display apparatus 100. Specifically, the communicator 220 may receive mobile terminal images from the display apparatus 100, and transmit the compensated movement information to the display apparatus 100.

The controller 230 controls general operation of the mobile terminal 200. Specifically, the controller 230 calculates coordinate values based on the sensed movement information through the sensor 210, and transform the calculated coordinate values into the screen coordinate system which is arrayed based on the screen of the display apparatus 100. Herein, the controller 230 may transform coordinate values according to a consecutive order of the mobile terminal coordinate system, the global coordinate system, then the screen coordinate system, as described above.

Further, the controller 230 controls the communicator 220 to receive mobile terminal images from the display apparatus 100.

The controller 230 may compensate the movement information based on the received mobile terminal images. Specifically, the controller 230 may compensate the movement information by comparing the size of the mobile terminal obtained from the mobile terminal images with the previously obtained actual size of the mobile terminal. Further, the controller 230 may synchronize the movement information of the mobile terminal obtained from the mobile terminal images and the movement information transformed into the screen coordinate system by comparing the movement information of the mobile terminal obtained from the mobile terminal images with the movement information transformed into the screen coordinate system.

Further, the controller 230 may transmit the compensated movement information to the display apparatus 100.

Meanwhile, the controlling method of the display apparatus according to the above various exemplary embodiments may be implemented to be programs and provided to the display apparatus or inputting devices. Specifically, programs including the controlling method of the display apparatus may be stored and provided in non-transitory computer readable recording medium.

Non-transitory computer readable recording medium indicate medium which store data semi-permanently and can be read by devices, not medium storing data temporarily such as register, cache, or memory. Specifically, the above various applications or programs may be stored and provided in non-transitory computer readable recording medium such as CDs, DVDs, hard disks, Blu-ray disks, USBs, memory cards, or ROM.

Further, the foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. A display apparatus, comprising:
a communicator configured to receive movement information of a mobile terminal from the mobile terminal;
an image acquirer configured to obtain mobile terminal images by photographing the mobile terminal; and
a processor configured to transform the received movement information into a screen coordinate system based on a screen of the display apparatus, compensate the movement information of the screen coordinate system based on the mobile terminal images, and control the display apparatus by using the compensated movement information,
wherein the processor transforms the movement information of the mobile terminal to a global coordinate system based on geomagnetic direction and transforming the movement information of the global coordinate system into the screen coordinate system.

2. The display apparatus of claim 1, wherein the received movement information from the mobile terminal is a value measured based on a mobile terminal coordinate system.

3. The display apparatus of claim 1, wherein, when a camera coordinate system arrayed based on a camera photographing the mobile terminal is not in agreement with the screen coordinate system, the controller transforms the movement information transformed into the screen coordinate system into the camera coordinate system.

4. The display apparatus of claim 1, wherein, when an input is received from a user while the mobile terminal is arrayed toward a screen direction of the display apparatus, transforming parameters of the screen coordinate system are calculated based on a shape of the mobile terminal.

5. The display apparatus of claim 1, wherein the controller compensates the movement information by comparing a size of the mobile terminal obtained from the mobile terminal images with a previously obtained actual size of the mobile terminal.

6. The display apparatus of claim 1, wherein the controller compares the movement information of the mobile terminal obtained from the mobile terminal images with the movement information transformed into the screen coordinate system, and synchronizes the movement information of the mobile terminal obtained from the mobile terminal images with the movement information transformed into the screen coordinate system, when the movement information of the mobile terminal obtained from the mobile terminal images is not in agreement with the movement information transformed into the screen coordinate system.

7. The display apparatus of claim 1, wherein, when there is a plurality of mobile terminals operating, the controller senses movement patterns respectively corresponding to the plurality of the mobile terminals by using the compensated movement information, respectively, related to the plurality of the mobile terminals, and recognizes the plurality of the mobile terminals by using the movement patterns respectively corresponding to the plurality of the mobile terminals.

8. The display apparatus of claim 1, wherein the controller controls the display apparatus based on the compensated movement information only when the mobile terminal is photographed.

9. The display apparatus of claim 1, further comprising:
a display,
wherein the controller controls the display to calculate pointing coordinate values based on the compensated movement information, and displays a pointer based on the pointing coordinate values.

10. A controlling method of a display apparatus, comprising:
receiving movement information of a mobile terminal from the mobile terminal and obtaining mobile terminal images by photographing the mobile terminal;
transforming the received movement information into a screen coordinate system based on a screen of the display apparatus;
compensating the movement information of the screen coordinate system based on the mobile terminal images; and
controlling the display apparatus by using the compensated movement information,
wherein the transforming comprises:
transforming the movement information of the mobile terminal to a global coordinate system based on geomagnetic direction and transforming the movement information of the global coordinate system into the screen coordinate system.

11. The controlling method of claim 10, wherein the received movement information from the mobile terminal is a value measured based on a mobile terminal coordinate system.

12. The controlling method of claim 10, wherein the transforming the received movement information into the screen coordinate system further comprises:
when a camera coordinate system arrayed based on a camera photographing the mobile terminal is different from the screen coordinate system, transforming the movement information transformed into the screen coordinate system into the camera coordinate system.

13. The controlling method of claim 10, wherein, when inputs are received from a user while the mobile terminal is arrayed toward a screen direction of the display apparatus, transforming parameters of the screen coordinate system are calculated based on a shape of the mobile terminal.

14. The controlling method of claim 10, wherein the compensating includes compensating the movement information by comparing a size of the mobile terminal obtained from the mobile terminal images with a previously obtained actual size of the mobile terminal.

15. The controlling method of claim 10, wherein the compensating comprises:
comparing the movement information of the mobile terminal obtained from the mobile terminal images with the movement information transformed into the screen coordinate system; and
when the movement information of the mobile terminal obtained from the mobile terminal images is not in agreement with the movement information transformed into the screen coordinate system, synchronizing the movement information of the mobile terminal obtained from the mobile terminal images with the movement information transformed into the screen coordinate system.

16. The controlling method of claim 10, wherein the controlling comprises:
when there is a plurality of mobile terminals operating, sensing movement patterns respectively corresponding to the plurality of the mobile terminals by using the compensated movement information, respectively, with respect to the plurality of the mobile terminals; and
recognizing the plurality of the mobile terminals by using the movement patterns respectively corresponding to the plurality of the mobile terminals.

17. The controlling method of claim 10, wherein the controlling includes controlling the display apparatus based on the compensated movement information only when the mobile terminal is photographed.

18. The controlling method of claim 10, wherein the controlling comprises:
calculating pointing coordinate values based on the compensated movement information; and
displaying a pointer on the pointing coordinate values.

* * * * *